(12) United States Patent
Rajak et al.

(10) Patent No.: US 11,823,129 B2
(45) Date of Patent: Nov. 21, 2023

(54) ITEM COLLECTION GUIDANCE SYSTEM

(71) Applicant: ZEBRA TECHNOLOGIES CORPORATION, Lincolnshire, IL (US)

(72) Inventors: Aleksandar Rajak, Ottawa (CA); Alexander Miller, Ottawa (CA)

(73) Assignee: Zebra Technologies Corporation, Lincolnshire, IL (US)

(*) Notice: Subject to any disclaimer, the term of this patent is extended or adjusted under 35 U.S.C. 154(b) by 217 days.

(21) Appl. No.: 16/885,990

(22) Filed: May 28, 2020

(65) Prior Publication Data

US 2021/0374666 A1  Dec. 2, 2021

(51) Int. Cl.
G06Q 10/0875 (2023.01)
G06Q 30/0601 (2023.01)
G06V 20/20 (2022.01)

(52) U.S. Cl.
CPC ..... G06Q 10/0875 (2013.01); G06Q 30/0637 (2013.01); G06V 20/20 (2022.01)

(58) Field of Classification Search
CPC .......... G06Q 10/087; G06Q 30/0637; G06Q 30/0639; G06Q 30/0635; G06Q 30/0633; G06Q 10/0875; G06V 20/20
See application file for complete search history.

(56) References Cited

U.S. PATENT DOCUMENTS

| | | | |
|---|---|---|---|
| 6,310,964 B1 | 10/2001 | Mohan et al. | |
| 7,769,221 B1* | 8/2010 | Shakes | G06Q 10/087 705/28 |
| 9,996,818 B1 | 6/2018 | Ren et al. | |
| 2005/0097064 A1* | 5/2005 | Werden | G07G 1/0054 705/400 |
| 2006/0131402 A1 | 6/2006 | Crockett et al. | |
| 2007/0100713 A1 | 5/2007 | Del Favero et al. | |
| 2009/0063307 A1 | 3/2009 | Groenovelt et al. | |
| 2016/0109281 A1* | 4/2016 | Herring | G07G 1/0054 177/1 |
| 2018/0036773 A1* | 2/2018 | Arnason | A22C 25/08 |
| 2021/0103974 A1* | 4/2021 | Thomas | G06F 3/048 |

OTHER PUBLICATIONS

"6 Things to Avoid When Grocery Shopping Online", Jul. 22, 2020, https://www.eatthis.com/grocery-shopping-online/ (Year: 2020).*
"Instacart Shopper App Tutorial | Let's Batch Together (2020/2021)", Apr. 30, 2020, time index 6:13, https://www.youtube.com/watch?v=1jqRUrZnXLE, hereinafter "Youtube" (Year: 2020).*
International Search Report and Written Opinion for International Application No. PCT/US2021/033705 dated Aug. 24, 2021.

* cited by examiner

Primary Examiner — Allen C Chein (57) ABSTRACT

A method includes: obtaining a task definition including (i) an item identifier, (ii) an original item quantity, and (iii) a normalized item quantity; presenting the normalized item quantity; obtaining an image of a collected item set; deriving collected item data from the image; determining whether the collected item data matches the item identifier and the original item quantity; and generating first output data or second output data according to whether the collected item data matches the item identifier and the original item quantity, or does not match the item identifier and the original item quantity.

17 Claims, 7 Drawing Sheets

ITEM COLLECTION GUIDANCE SYSTEM

BACKGROUND

Some retailers offer services such as delivery of online orders, or "buy online, pick up in store" (BOPIS), enabling customers to place orders via a network. The orders may then be filled by store staff, and picked up by customers or delivered to customer premises. Items are typically collected manually by in-store staff for such services. A wide variety of items may be available for selection, and orders may be defined in various formats. The above variability can render in-store order filling prior to pick up or delivery time-consuming and error-prone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining a task definition including (i) an item identifier, (ii) an original item quantity, and (iii) a normalized item quantity; presenting the normalized item quantity; obtaining an image of a collected item set; deriving collected item data from the image; determining whether the collected item data matches the item identifier and the original item quantity; and generating first output data or second output data according to whether the collected item data matches the item identifier and the original item quantity, or does not match the item identifier and the original item quantity.

Additional examples disclosed herein are directed to a computing device, comprising: an image sensor; an output assembly; and a processor configured to: obtain a task definition including (i) an item identifier, (ii) an original item quantity, and (iii) a normalized item quantity; presenting the normalized item quantity via the output assembly; obtain an image of a collected item set via the image sensor; derive collected item data from the image; determine whether the collected item data matches the item identifier and the original item quantity; and generate first output data or second output data according to whether the collected item data matches the item identifier and the original item quantity, or does not match the item identifier and the original item quantity.

Further examples disclosed herein are directed to a non-transitory computer-readable medium storing instructions executable by a processor of a computing device to: obtain a task definition including (i) an item identifier, (ii) an original item quantity, and (iii) a normalized item quantity; presenting the normalized item quantity via an output assembly; obtain an image of a collected item set via an image sensor; derive collected item data from the image; determine whether the collected item data matches the item identifier and the original item quantity; and generate first output data or second output data according to whether the collected item data matches the item identifier and the original item quantity, or does not match the item identifier and the original item quantity.

Figure 1:
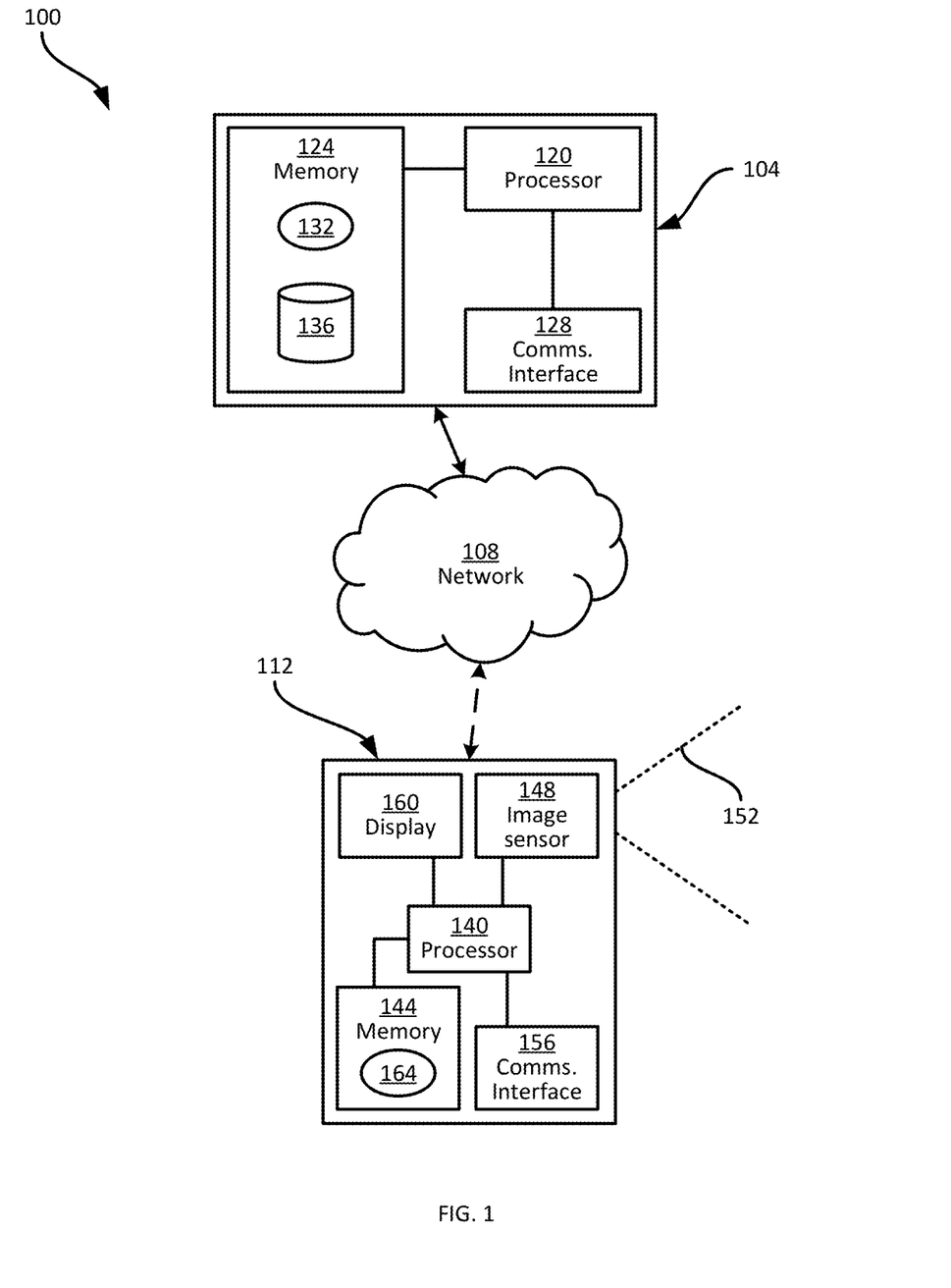
FIG. 1 is a diagram of a system for item collection guidance.

FIG. 1 shows an item collection guidance system 100. The system 100 can be deployed for use in a wide variety of facilities, including retailers (e.g. grocers), warehouses or other transport and logistics facilities, and the like. The system 100 is employed to assist in filling orders for items received from customers or other entities. For example, in the context of a retailer, an order may be received from a customer computing device. In particular, the order may be received at a server 104 via a network 108 (e.g. any suitable combination of local and wide area networks, including the Internet). The order may identify at least one item, as well as a desired quantity of the item.

Orders received at the server 104 are deployed to workers in the facility for collection of the desired quantities of the identified items. For example, orders may be transmitted from the server 104 to a mobile computing device 112 (also referred to simply as a device 112) operated by a worker. The data transmitted to the device 112, for presentation to the worker, can include item identifiers, quantities and the like. The data provided to the device 112 can also include additional information such as item location(s) within the facility.

The worker, with reference to the data presented by the device 112, can travel through the facility and collect the indicated items, for later pick up by the customer or delivery to the customer. As will be apparent, orders may specify information such as item quantities in a wide variety of formats. For example, items of produce in a grocer may be specified by count, weight, or volume. Certain quantity formats are more readily assessed by workers than others (e.g. count), while other quantity formats may involve the use of additional equipment to assess, such as a scale. Further, certain items, such as varieties of produce items (e.g. apples, pears and the like), may be difficult to quickly distinguish by workers. The format in which an order specifies the desired quantity of an item, as well as how readily distinguishable from other items the item is, can complicate the collection of items for an order. The above factors may contribute to increased collection time and/or decreased collection accuracy.

As will be discussed below in greater detail, the server 104 and the device 112 implement functionality to assist or guide a worker to complete item collection for an order. For example, the server 104 and the device 112 may cooperate to provide to the worker normalized item quantity data, and may also provide item verification to confirm whether a collected item matches an item requested in an order.

Certain internal components of the server 104 and the device 112 are also shown in FIG. 1. In particular, the server 104 includes a special-purpose controller, such as a processor 120, interconnected with a non-transitory computer readable storage medium, such as a memory 124. The memory 124 includes a suitable combination of volatile memory (e.g. Random Access Memory or RAM) and non-volatile memory (e.g. read only memory or ROM, Electrically Erasable Programmable Read Only Memory or EEPROM, flash memory). The processor 120 and the memory 124 each comprise at least one integrated circuit.

The server 104 also includes a communications interface 128 enabling the server 104 to communicate with other computing devices via the network 108, including the device 112. The memory 124 stores computer readable instructions for execution by the processor 120. In particular, the memory 124 stores an order tracking application 132 (also referred to simply as the application 132). When executed by the processor 120, the application 132 configures the processor 120 to perform various functions discussed below in greater detail and related to receiving order data (e.g. from a customer), generating a task definition for deployment to the device 112 for use during item collection to fulfill the order, and tracking completion of the item collection. The application 132 may also be implemented as a suite of distinct applications in other examples.

The memory 124 also stores a repository 136 containing item attributes used in the generation of task definitions as mentioned above. The item attributes can include physical attributes such as average dimensions, density measurements, and the like.

The device 112, which may be implemented as a tablet computer or other mobile device, includes a special-purpose controller, such as a processor 140, which may be interconnected with or include a non-transitory computer readable storage medium such as a memory 144. The processor 140 and the memory 144 can be implemented as at least one integrated circuit. In some examples, the processor 140 and at least a portion of the other components of the device 112 (including the memory 144) can be implemented on a single integrated circuit, e.g. as a system on a chip (SoC).

The device 112 also includes an image sensor 148. The image sensor 148 can include any suitable combination of a camera, a stereo camera assembly (e.g. a pair of infrared sensors, or the like), time-of-flight (ToF) camera, lidar device, or the like. The image sensor 148 is controllable by the processor 140 to capture at least image data (e.g. an array of pixels with color information) covering a field of view (FOV) 152. The image sensor 148 can also capture depth information in some examples (e.g. when a ToF or stereo camera is employed), such that the captured data defines a point cloud representing objects within the FOV 152. More generally, the image sensor 148 can capture at least one of color data and depth data (e.g. a point cloud) for objects within the FOV 152.

The device 112 further includes a communications interface 156, enabling the device 112 to communicate with other computing devices via the network 108, including the server 104. For example, the interface 156 can include a suitable combination of transceivers, controllers and the like to establish a link with the network 108.

The device 112 also includes a display 160, controllable by the processor 140 to present data to the operator of the device 112. The device 112 can also include an input assembly, such as a touch screen integrated with the display 160, a microphone, a keypad, or the like.

The memory 144 stores computer-readable instructions including an application 164. When executed by the processor 140, the application 164 configures the processor 140 to implement various functionality related to the receipt and processing of order data from the server 104, and the presentation (e.g. via the display 160) of information derived from the order data to guide the collection of items to fulfill an order.

Those skilled in the art will appreciate that the functionality implemented by either or both of the processor 120 and the processor 140 via the execution of the applications 132 and 164 may also be implemented by one or more specially designed hardware and firmware components, such as FPGAs, ASICs and the like in other embodiments.

Figure 2:
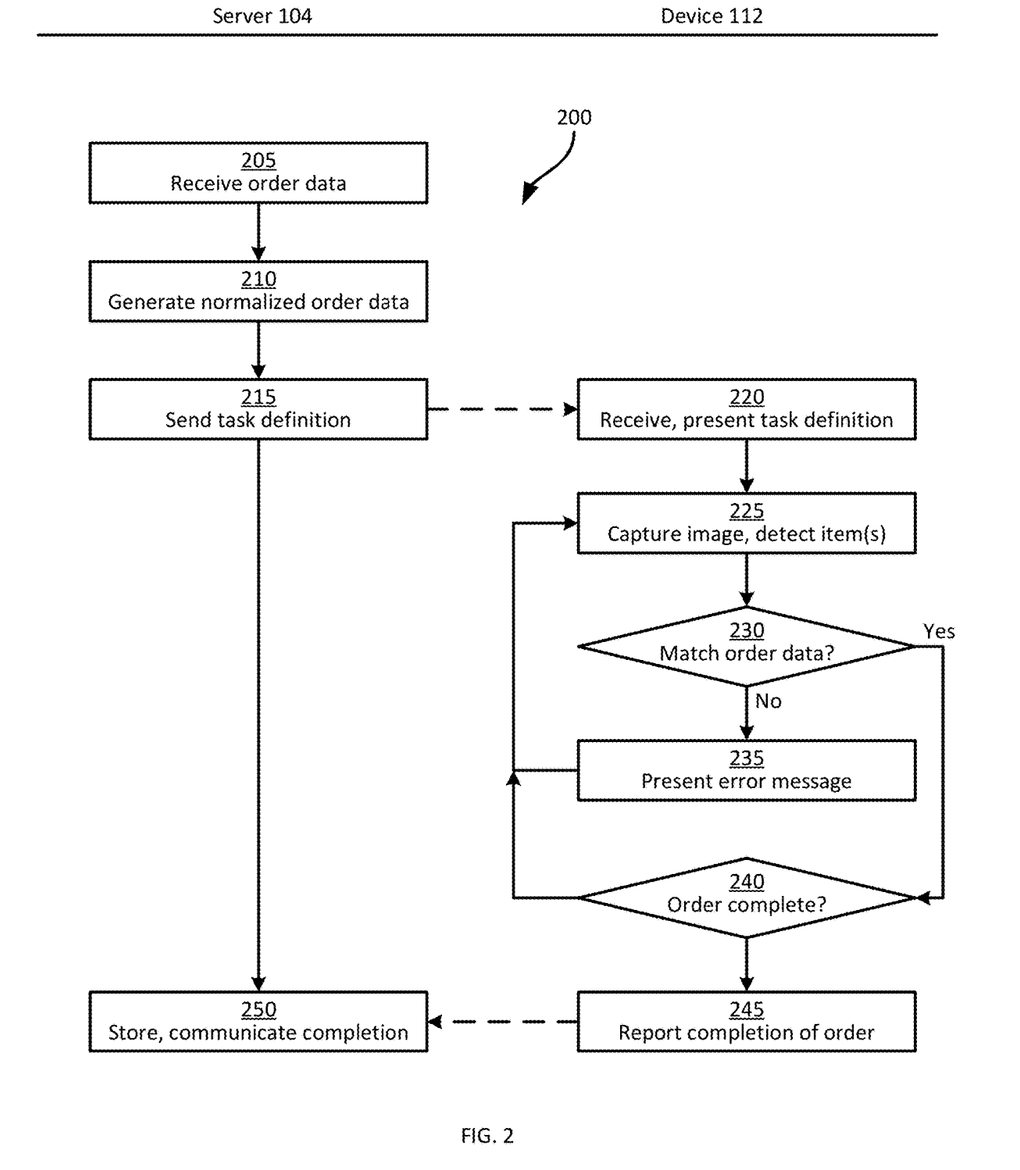
FIG. 2 is a flowchart of a method for item collection guidance.

Turning now to FIG. 2, a method 200 for item collection guidance is illustrated. The method 200 will be discussed below in conjunction with its performance in the system 100, but it will be apparent to those skilled in the art that the method 200 may also be performed by other systems equivalent to that shown in FIG. 1. Certain blocks of the method 200 are illustrated as being performed by the server 104, while other blocks of the method 200 are illustrated as being performed by the device 112.

At block 205, the server 104 is configured to receive order data, e.g. from a customer computing device via the network 108. The order data includes, for at least one item, an item identifier and an original item quantity. The order data can include such data for a plurality of items, but the examples below will discuss the performance of the method 200 in connection with an order identifying a single item for illustrative purposes. As will be apparent to those skilled in the art, the order data may include other parameters, such as a customer identifier and the like, not shown herein.

The server 104 can store the order data in the memory 124, e.g. in association with an order identifier. The server 104 also, at block 210, is configured to generate normalized order data. Specifically, the order data can specify the original item quantity in various formats, including by count (i.e. number of items), by volume, by weight, or the like. The server 104 is configured to generate a normalized item quantity by count, as a count of item may be faster and/or more accurate to retrieve for a worker, particularly in the context of items of produce (e.g. fruits and vegetables).

The normalized item quantity is generated based on item attributes in the repository 136. For example, the repository 136 can contain a record of such attributes for each available item. The attributes can include any one of, or any combination of, average volumes, dimensions and weights of items, physical densities of items, and the like.

Figure 3:
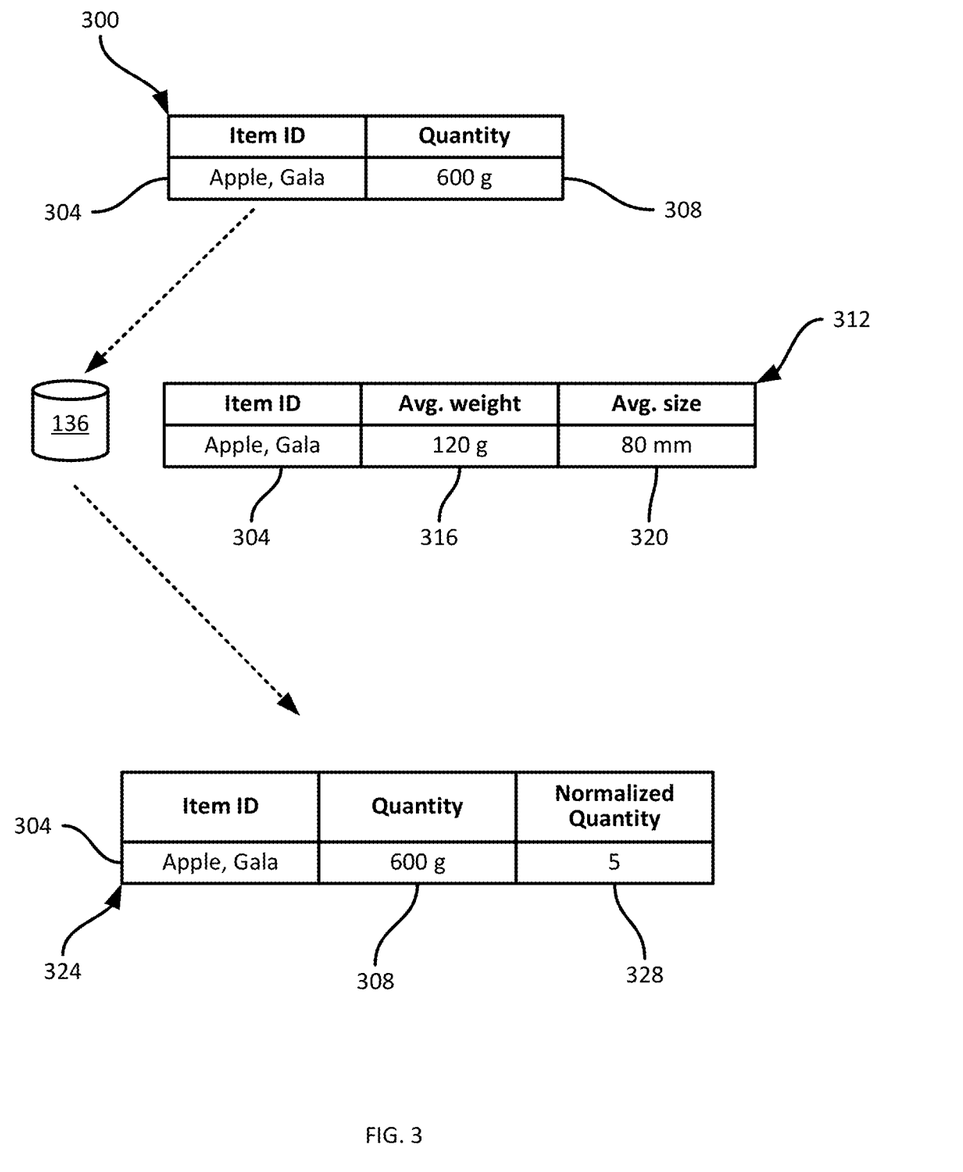
FIG. 3 is a diagram illustrating an example performance of block 210 of the method of FIG. 2.

Referring to FIG. 3, an example performance of blocks 205 and 210 is illustrated. In particular, order data 300 is shown as received at the server 104, including an item identifier 304 and an original item quantity 308. As will be apparent, the original item quantity is specified by weight in this example, which may be difficult to assess without the time-consuming use of additional equipment such as a scale. The server 104 is therefore configured to retrieve a record 312 from the repository 136 that corresponds to the item identifier 304. In the present example, the record 312 contains the item identifier 304, as well as two item attributes in the form of an average item weight 316 and an average item size 320 (e.g. diameter, although a wide variety of other dimensions may also be specified). The server 104 is configured to select the attribute corresponding to the original item quantity 308 (that is, the attribute having the same format as the original item quantity 308, which in the present example is the attribute 316). From the selected attribute, the server 104 generates a normalized item quantity in the form of an item count.

The server generates a task definition 324 including the item identifier 304, the original item quantity 308, and a normalized item quantity 328, derived from the original item quantity 308 and the attribute 316. In particular, the normalized item quantity 328 can be obtained by dividing the original item quantity 308 by the average weight attribute 316.

Figure 4:
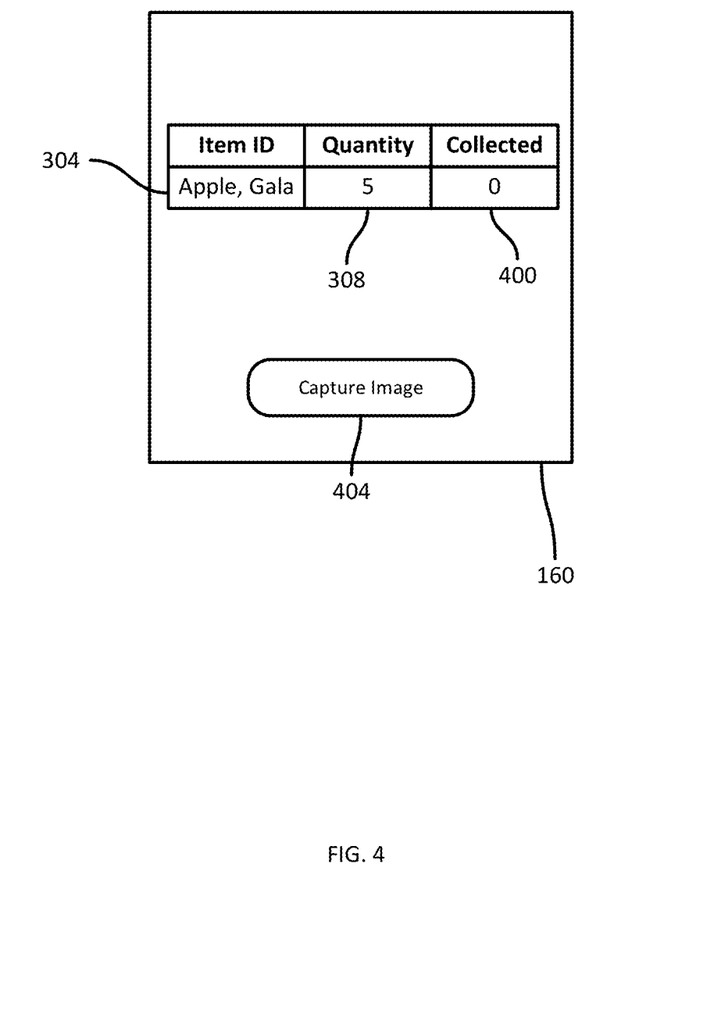
FIG. 4 is a diagram illustrating an example performance of block 220 of the method of FIG. 2.

Returning to FIG. 2, at block 215 the server 104 transmits the task definition 324 to the device 112, e.g. via the network 108. At block 220, the device 112 receives and stores the task definition 324 in the memory 144. The device 112 can also present at least a portion of the task definition on the display 160. Referring briefly to FIG. 4, the display 160 is shown with the item identifier 304 and the normalized quantity 328 rendered thereon. The device 112 can also present a current collection status 400 for the item, indicating how many items have been collected.

As also illustrated in FIG. 4, the device 112 presents an image capture command 404 on the display 160. The command 404, when selected, causes the device 112 to capture an image using the image sensor 148, as will be discussed in greater detail. The command 404 need not be rendered on the display 160 in other examples. For example, an image capture operation may instead be initiated via activation of a hardware button, a voice command, or the like.

When the device 112 has received the task definition 324 and presented at least a portion thereof as shown in FIG. 4, the operator of the device 112 may begin collection of the items indicated by the task definition 324. The operator of the device 112 may then, e.g. when the items have been collected, invoke validation functionality of the device 112 by instructing the device 112 to capture an image, e.g. via selection of the command 404. In particular, turning briefly to FIG. 5, the operator may placed the picked items on a surface 500, such as a cart or the like used to collect items for an order. Other surfaces may also be employed, such as a table or the like.

Figure 5:
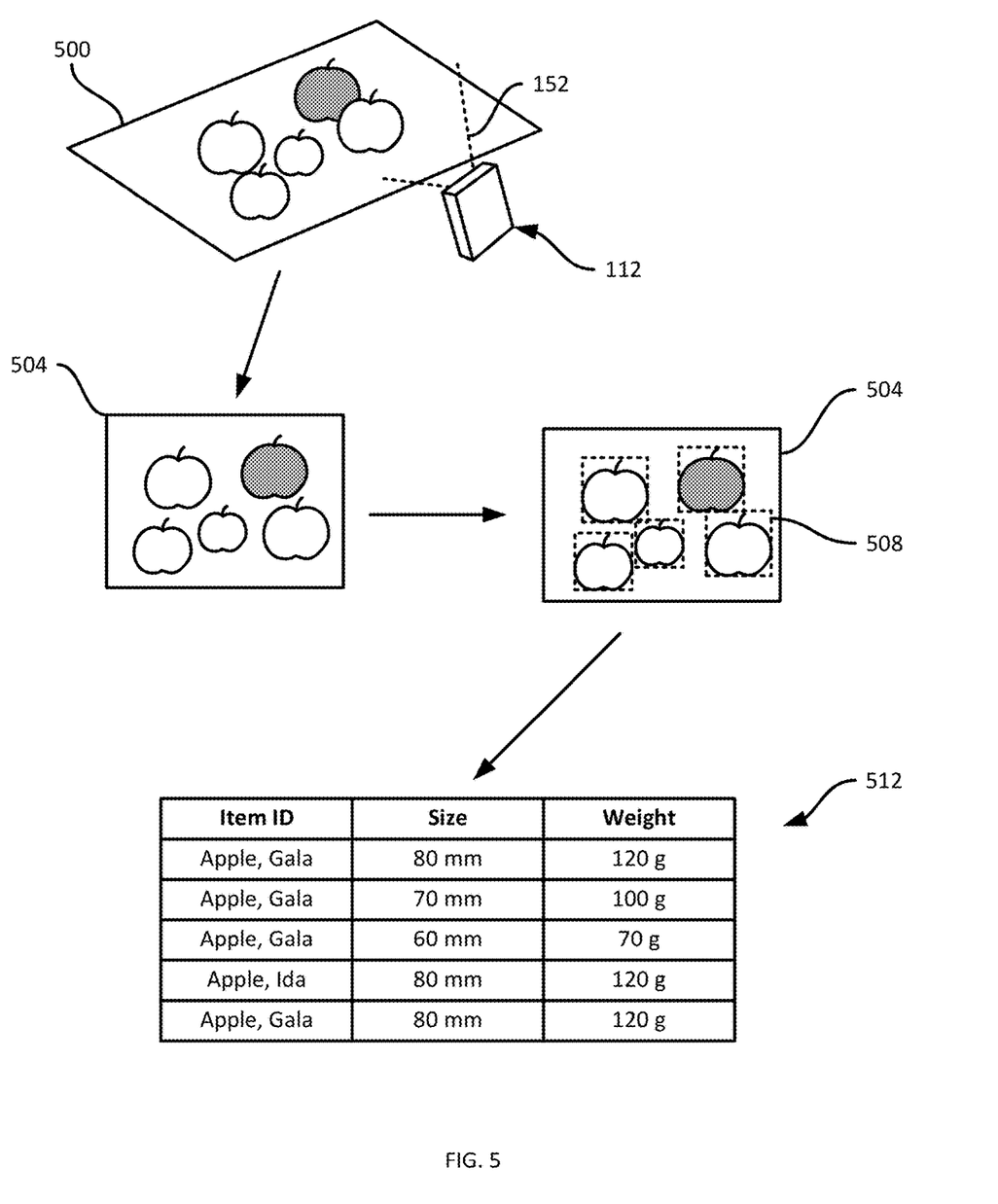
FIG. 5 is a diagram illustrating an example performance of block 225 of the method of FIG. 2.

Referring again to FIG. 2, at block 225 the device 112 is configured to capture an image of the collected items and detect the collected items from the image. Turning again to FIG. 5, the device 112 is shown positioned to encompass the items on the surface 500 within the FOV 152 of the image sensor 148. In response to selection of the command 404 or another suitable input, the processor 140 controls the image sensor 148 to capture an image of the items on the surface 500. FIG. 5 also illustrates an example image 504 captured as described above. As shown, the image 504 depicts five apples of varying sizes and types (e.g. the dark-colored apple may be of a different variety than the other four apples).

To detect items in the image 504, the processor 140 is configured to apply any suitable combination of image processing operations to the image. For example, a segmentation operation can be applied to detect the boundaries of the items, as indicated in the form of bounding boxes in FIG. 5. Object classification operations may be applied to the image 504 (e.g. to the regions of the image 504 within the bounding boxes 508) to identify which types of items are present in the image 504. In addition, photogrammetry or other dimensioning operations can be applied to the image 504 to determine dimensions (e.g. linear dimensions such as height or width, or other dimensions such as volumes) of the items detected. Further, the processor 140 can be configured to derive additional properties of the collected items, e.g. by retrieving item attributes from the repository 136 or a local copy thereof.

Thus, as illustrated in FIG. 5, the device 112 may generate collected item data 512 indicating, for each detected item, an item identifier, as well as a size (e.g. a diameter), and a weight. The weight may be determined from a volume extracted from the image 504 and a known density of the corresponding item type from the repository 136. In other examples, the weight may be determined from a ratio between the detected size and the average size in the repository 136. An associated ratio (e.g. the cube of the ratio of sizes) may be applied to the average weight from the repository 136 to obtain the collected item weight shown in FIG. 5.

In other words, the device 112 detects items and derives collected item data from the captured image. The collected item data includes at least a collected quantity in the same format as the original item quantity. Thus, as shown in FIG. 5, weights for each of the detected apples (and, by extension, a total weight) are determined at block 225.

Returning to FIG. 2, at block 230 the device 112 is configured to determine whether the collected item data from block 225 matches the order data received from the server 104 at block 220. The determination at block 230 can include, for example, a comparison of the original item identifier with the collected item identifier(s) from block 225. As seen in FIG. 5, the comparison at block 230 indicates that the collected items do not match the task definition, because one of the five collected apples is of the wrong type, having the item identifier "Ida" rather than "Gala". The determination at block 230 is therefore negative.

The determination at block 230 can also include a comparison of the collected item quantity and the original item quantity. That is, although the normalized item quantity is presented via the display 160 to guide the worker filling the order, validation of the order is performed based on the original item quantity. If the collected quantity is below the original quantity, the determination at block 230 is affirmative. That is, the collected items may represent a partial completion of the order, and need not represent the complete set of items in the order. When the collected quantity exceeds the original quantity, however (e.g. by more than a predefined margin), the determination at block 230 is negative.

Figure 6:
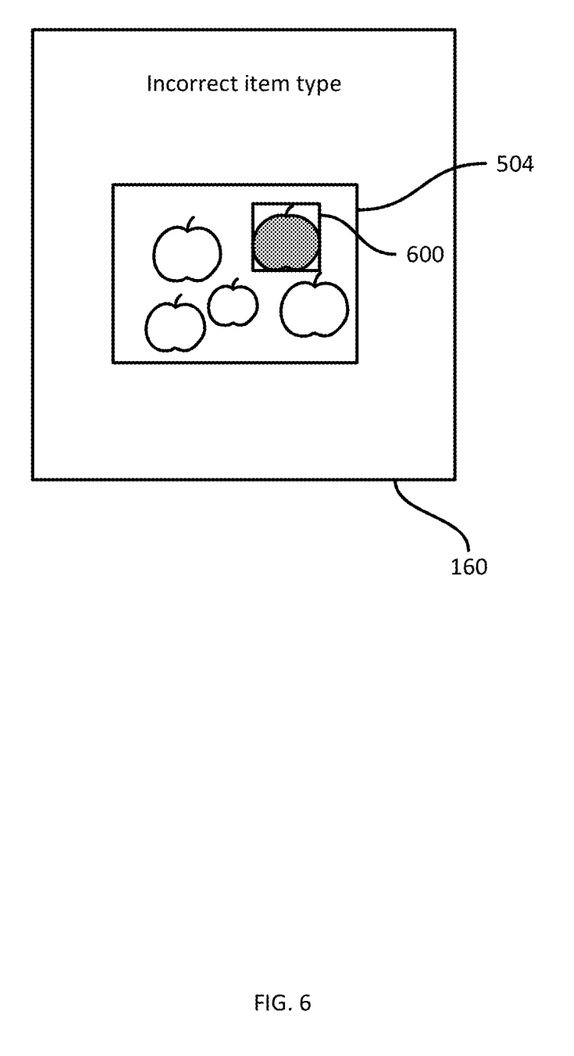
FIG. 6 is a diagram illustrating an example performance of block 235 of the method of FIG. 2

Following a negative determination at block 230, the device 112 can present an error message at block 235. The error message can be presented on the display 160, and may indicate that the collected items do not match the task definition. The error message may also indicate specifically which item or items collected resulted in the negative determination at block 230. For example, the device 112 may present the image 504 on the display 160, with an indication of the non-compliant item(s). Turning to FIG. 6, an example error message is shown on the display 160, including an indicator 600 such as a box surrounding the incorrectly collected item.

Referring again to FIG. 2, following the performance of block 235 the device 112 returns to block 225. The error message may also contain a prompt instructing the operator to remove the mismatched item and capture another image. The collected item data derived at block 225 may be discarded in the event of a negative determination at block 230.

In the present example performance of the method 200, it is assumed that the incorrectly collected apple is removed from the surface 500, and another image is captured of the remaining four apples. A subsequent performance of block 230 is affirmative, because the four collected apples are of the correct variety, and because the combined weight of the four collected apples does not exceed the original item data. The device 112 therefore proceeds to block 240.

As will be apparent, therefore, the output data generated by the device 112 is dependent on the determination at block 230, with the storing of partial completion data (e.g. the status indicator 400a) and/or the reporting of order completion representing a first type of output data, and the error message representing a second type of output data.

At block 240, the device 112 is configured to determine whether the order, as defined by the task definition from block 220, is complete. The determination at block includes comparing a current collected quantity of each item in the order, derived from one or more image captures, to the original item quantity specified for each item. When the determination at block 240 is negative, the device 112 returns to block 225 to capture a further image, e.g. after collection of additional items by the operator of the device 112.

Figure 7:
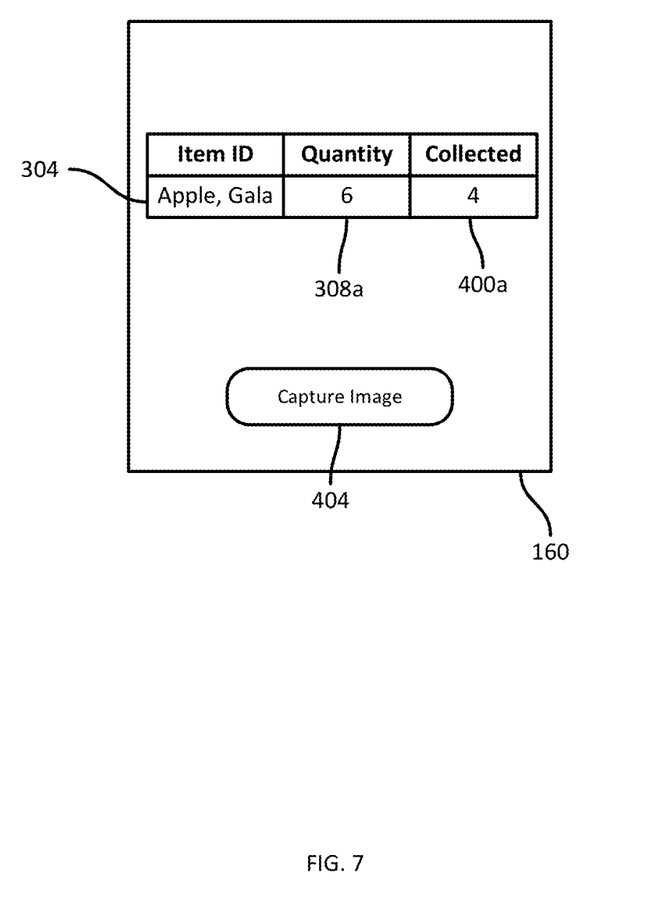
FIG. 7 is a diagram illustrating information displayed following an affirmative determination at block 230 of the method of FIG. 2.

The device 112 may also update the current collection status 400 shown in FIG. 4. For example, turning to FIG. 7, the display 160 is shown following the affirmative determination at block 230 described above and a negative determination at block 240. The collection status 400 has been updated to a collection status indicator 400a, to indicate that four apples have been collected. In addition, the normalized quantity has been updated to a normalized item quantity 308a, reflecting the fact that two of the collected apples were of below-average weight and that a greater number of apples will therefore be required to satisfy the original item quantity of 600 grams.

When the determination at block 240 is affirmative, the device 112 proceeds to block 245. At block 245, the device 112 is configured to report an order completion to the server 104. The order completion reported to the server 104 can include the normalized item quantity 308a, as well as a collected item quantity in the same format as the original item quantity. The server 104, at block 250, may store the order completion report and initiate other actions, such as notifying a customer that the order is ready for pick up.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining, by a processor, a task definition including (i) an item identifier, (ii) an original item quantity, and (iii) a normalized item quantity;
   presenting, by the processor, the item identifier and the normalized item quantity;
   obtaining, by the processor, an image of a collected item set;
   deriving, by the processor, collected item data from the image, the collected item data being indicative of, for each item of the collected item set, (i) a collected item identifier, (ii) a collected item size, (iii) a collected item weight, and (iv) a collected item count;
   determining, by the processor, whether the collected item data matches the item identifier and the original item quantity;
   in response to determining the collected item data matches the item identifier and the original item quantity, generating, by the processor, first output data; and
   in response to determining-does not match the item identifier and the original item quantity, generating, by the processor, second output data.

2. The method of claim 1, further comprising:
   prior to obtaining the task definition, obtaining, by the processor, order data including the item identifier and the original item quantity; and
   generating, by the processor, the normalized item quantity.

3. The method of claim 2, wherein generating the normalized item quantity includes:
   retrieving an item attribute based on the item identifier; and
   generating the normalized item quantity based on the original item quantity and the item attribute.

4. The method of claim 1, wherein obtaining the task definition includes receiving the task definition from a server at a mobile computing device.

5. The method of claim 1, further comprising: determining, by the processor, a collected item quantity from the collected item count.

6. The method of claim 1, wherein the first output data includes a collection status indicator.

7. The method of claim 1, wherein the second output data includes an error message indicating a mismatch between the task definition and the collected item data.

8. The method of claim 1, wherein obtaining the image includes controlling an image sensor to capture the image; and
   wherein deriving the collected item data includes detecting items from the image.

9. A computing device, comprising:
   an image sensor;
   an output assembly; and
   a processor configured to:
      obtain a task definition including (i) an item identifier, (ii) an original item quantity, and (iii) a normalized item quantity;
      present the item identifier and the normalized item quantity via the output assembly;
      obtain an image of a collected item set via the image sensor;
      derive collected item data from the image, the collected item data being indicative of, for each item of the collected item set, (i) a collected item identifier, (ii) a collected item size, (iii) a collected item weight, and (iv) a collected item count;
      determine whether the collected item data matches the item identifier and the original item quantity;
      in response to determining the collected item data matches the item identifier and the original item quantity, generate first output data; and
      in response to determining the collected item data does not match the item identifier and the original item quantity, generate second output data.

10. The computing device of claim 9, wherein the processor is further configured to:
   prior to obtaining the task definition, obtain order data including the item identifier and the original item quantity; and
   generate the normalized item quantity.

11. The computing device of claim 10, wherein the processor is configured, in order to generate the normalized item quantity, to:
   retrieve an item attribute based on the item identifier; and
   generate the normalized item quantity based on the original item quantity and the item attribute.

12. The computing device of claim 9, wherein the processor is configured, in order to obtain the task definition, to receive the task definition from a server.

13. The computing device of claim 9, wherein the processor is further configured to: determine a collected item quantity from the collected item count.

14. The computing device of claim 9, wherein the first output data includes a collection status indicator.

15. The computing device of claim 9, wherein the second output data includes an error message indicating a mismatch between the task definition and the collected item data.

16. The computing device of claim 9, wherein the processor is further configured, in order to derive the collected item data, to detect items from the image.

17. A non-transitory computer-readable medium storing instructions executable by a processor of a computing device to:
   obtain a task definition including (i) an item identifier, (ii) an original item quantity, and (iii) a normalized item quantity;
   present the item identifier and the normalized item quantity via an output assembly;
   obtain an image of a collected item set via an image sensor;
   derive collected item data from the image, the collected item data being indicative of, for each item of the collected item set, (i) a collected item identifier, (ii) a collected item size, (iii) a collected item weight, and (iv) a collected item count;
   determine whether the collected item data matches the item identifier and the original item quantity;
   in response to determining the collected item data matches the item identifier and the original item quantity, generate first output data; and
   in response to determining the collected item data does not match the item identifier and the original item quantity, generate second output data.

* * * * *